US012587132B2

(12) United States Patent
Basarich et al.

(10) Patent No.: US 12,587,132 B2
(45) Date of Patent: *Mar. 24, 2026

(54) PHOTOVOLTAIC MODULE CLAMP ASSEMBLY

(71) Applicant: UNIRAC INC., Albuquerque, NM (US)

(72) Inventors: Kyle Basarich, Albuquerque, NM (US); Chris Kauffman, Rio Rancho, NM (US); Nathan Schuit, Moriarty, NM (US)

(73) Assignee: Unirac, Inc., Albuquerque, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/514,781

(22) Filed: Nov. 20, 2023

(65) Prior Publication Data

US 2024/0204716 A1 Jun. 20, 2024

Related U.S. Application Data

(63) Continuation of application No. 17/165,759, filed on Feb. 2, 2021, now Pat. No. 11,824,489.

(60) Provisional application No. 62/969,641, filed on Feb. 3, 2020.

(51) Int. Cl.
*F16B 2/12* (2006.01)
*H02S 30/10* (2014.01)

(52) U.S. Cl.
CPC ............... *H02S 30/10* (2014.12); *F16B 2/12* (2013.01)

(58) Field of Classification Search
CPC ...... F16B 2/12; F16B 2/04; F16B 2/06; F16B 2/065

USPC ... 248/229.1, 229.12, 229.14, 229.2, 229.22, 248/229.24, 228.5, 228.3, 230.2, 230.5, 248/231.41, 231.61
See application file for complete search history.

(56) References Cited

U.S. PATENT DOCUMENTS

| | | | |
|---|---|---|---|
| 1,245,047 A | 10/1917 | Sherman | |
| 4,379,651 A * | 4/1983 | Nagashima ............... | F16B 2/12 403/387 |
| 4,826,113 A | 5/1989 | Winters | |
| 5,626,321 A | 5/1997 | Ulshafer, Jr. | |
| 6,471,171 B1 | 10/2002 | VanderVelde | |
| 7,003,827 B2 | 2/2006 | DeMayo | |
| 7,866,099 B2 | 1/2011 | Komamine et al. | |
| 8,938,932 B1 | 1/2015 | Wentworth et al. | |

(Continued)

OTHER PUBLICATIONS

Office Action for U.S. Appl. No. 17/165,759, mailed on Mar. 27, 2023, Inventor #1 Kyle Basarich, "Photovoltaic Module Clamp Assembly," 6 pages.

(Continued)

*Primary Examiner* — Alfred J Wujciak
(74) *Attorney, Agent, or Firm* — Lee & Hayes, P.C.

(57) ABSTRACT

A clamp assembly configured to clamp a frame of a photovoltaic (PV) module, the clamp assembly including a first clamp portion shaped to receive an outside surface of the frame and a second clamp portion shaped to secure a flange of the frame between the second clamp portion and a portion of the first clamp portion, wherein the first clamp portion and the second clamp portion are mounted on a bolt. The clamp assembly further includes a stanchion having a first side and a second side, the first side and the second side including apertures through which the bolt is inserted.

20 Claims, 8 Drawing Sheets

(56)        References Cited

U.S. PATENT DOCUMENTS

| | | | |
|---|---|---|---|
| 9,825,581 B2 | 11/2017 | Wildes | |
| 11,824,489 B2 * | 11/2023 | Basarich | F16B 2/12 |
| 2010/0276558 A1 * | 11/2010 | Faust | F24S 25/12 |
| | | | 248/316.1 |
| 2012/0073220 A1 | 3/2012 | Kobayashi et al. | |
| 2016/0339800 A1 | 11/2016 | John | |
| 2019/0339037 A1 | 11/2019 | Burton | |
| 2021/0242826 A1 | 8/2021 | Basarich et al. | |

OTHER PUBLICATIONS

Office Action for U.S. Appl. No. 17/165,759, mailed on Sep. 27, 2022, Basarich, "Photovoltaic Module Clamp", 8 pages.

* cited by examiner

PHOTOVOLTAIC MODULE CLAMP ASSEMBLY

CROSS-REFERENCE TO RELATED PATENT APPLICATIONS

This application claims priority to and incorporates U.S. Non-Provisional patent application Ser. No. 17/165,759, filed Feb. 2, 2021, entitled "PHOTOVOLTAIC MODULE CLAMP ASSEMBLY," and U.S. Provisional Patent Application 62/969,641, filed Feb. 3, 2020, entitled "PHOTOVOLTAIC MODULE CLAMP," in their entirety by reference.

BACKGROUND

As the solar energy industry continues to grow, the equipment to mount photovoltaic (PV) modules (AKA "solar panels") on different types of structures and/or locations continues to adapt and improve as well. Though a variety of apparatuses exist to clamp onto and secure the PV modules, the number of parts and or different arrangements of the parts still leave much to be desired for an efficient and quick assembly to minimize the amount of time a worker may be working on a roof or in a similarly physically demanding or potentially hazardous condition.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items. Furthermore, the drawings may be considered as providing an approximate depiction of the relative sizes of the individual components within individual figures. However, the drawings are not to scale, and the relative sizes of the individual components, both within individual figures and between the different figures, may vary from what is depicted. In particular, some of the figures may depict components as a certain size or shape, while other figures may depict the same components on a larger scale or differently shaped for the sake of clarity.

DETAILED DESCRIPTION

Figure 1:
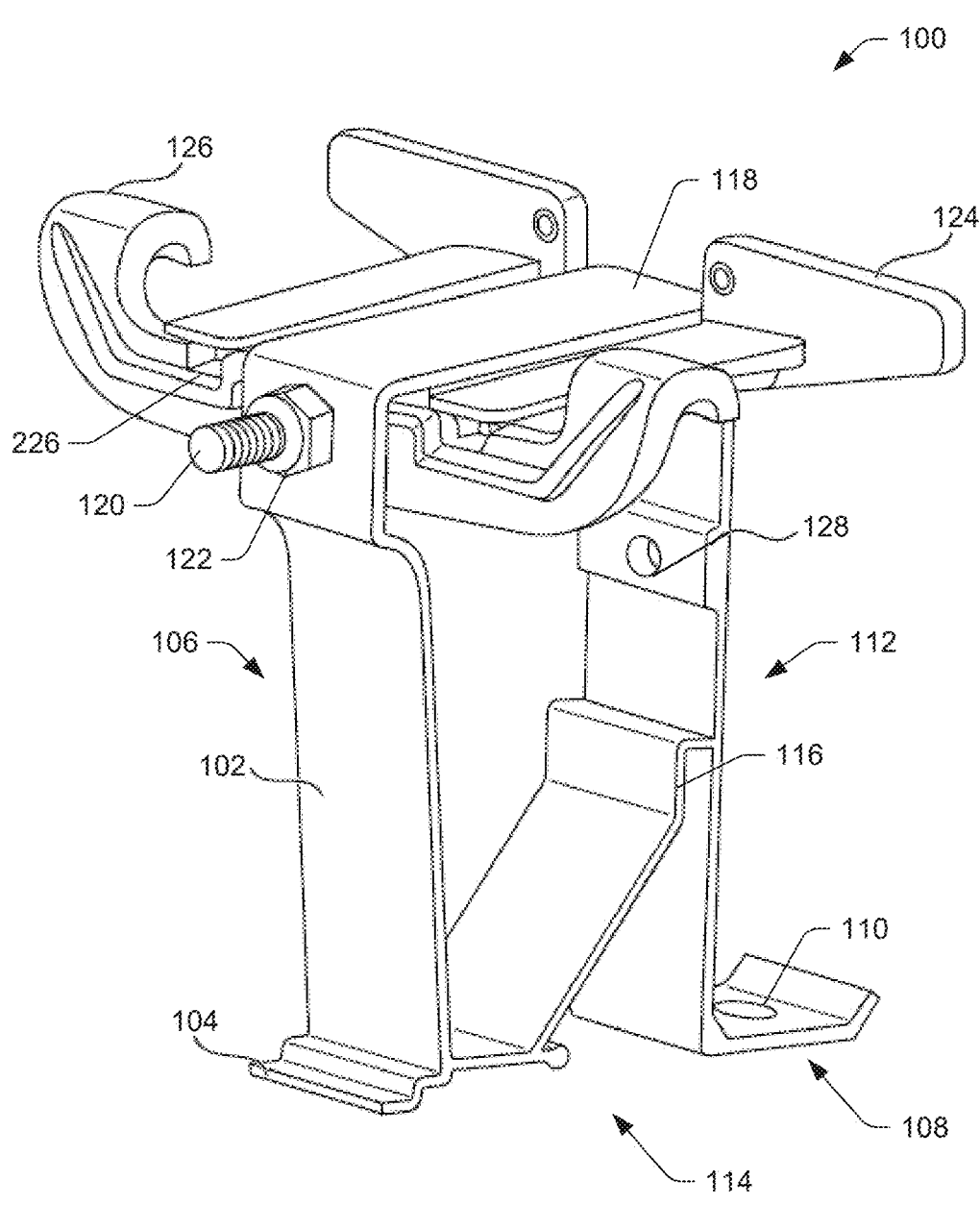
FIG. 1 illustrates a perspective view of an example clamp assembly according to an embodiment of this disclosure.

As described previously, there are many apparatuses and systems that exist to secure photovoltaic (PV) modules on various structures and/or locations. However, these apparatuses and systems often include parts and arrangements that are inefficient and may be difficult and/or time consuming to assemble. This disclosure is directed to a PV module clamp. More specifically, the present disclosure describes a stanchion clamp assembly (also referred to herein as "a clamp assembly"). The clamp assembly described herein may be configured to accommodate various types and sizes of PV modules. While describing the clamp assembly as being configured to secure PV modules, the clamp assembly may be used to attach other panel type structures in a location and/or on a structure.

In an embodiment, the clamp assembly described herein is configured to clamp and/or otherwise secure one or more PV modules. Furthermore, the clamp assembly described herein may be configured to secure a top portion (or a "north end") of a PV module and/or PV module frame while another clamp assembly (not shown herein) may be configured to secure a bottom portion (or a "south end") of a PV module and/or PV module frame.

The clamp assembly described herein may include a first clamp portion that is shaped to receive at least a portion of an outside of a PV module frame. The clamp assembly may further include a second clamp portion that is shaped to receive at least a portion of an inside of the PV module frame. Furthermore, the clamp assembly may include a stanchion having a first side and a second side and the first clamp portion and the second clamp portion may be disposed between the first side and the second side of the stanchion. For example, in an embodiment, the first clamp portion and the second clamp portion are mounted on a bolt that is inserted through apertures in the first side and the second side of the stanchion. As such, the first clamp portion and the second clamp portion may be mounted on the bolt between the first side and the second side of the stanchion.

In an embodiment, when the bolt is turned in a first direction, the bolt draws the second clamp portion toward the first clamp portion, thereby clamping the PV module frame therebetween. Furthermore, when the bolt is turned in a second direction opposite the first direction, the bolt may cause the second clamp to moved away from the first clamp portion. The clamp assembly may include a spring disposed on the bolt such that the spring abuts a surface of the first clamp portion and maintains a distance between the first clamp portion and the second clamp portion unless the spring is compressed by a force. In an embodiment, the clamp assembly may also include a spacer mounted on the bolt between a head of the bolt and a side of the stanchion. The spacer may prevent, minimize, and/or restrict movement of the bolt when a nut is not secured to a threaded portion of the bolt.

In an embodiment, the stanchion may include a top surface that spans a distance between the first clamp portion and the second clamp portion. Furthermore, in an embodiment, a surface of the first clamp portion abuts an interior surface of the first side of the stanchion and a surface of the second clamp portion abuts an interior surface of the second side of the stanchion. The first clamp portion may include one or more arms that extend in a direction towards the second clamp portion. In an embodiment, a portion of the PV module frame may rest on the one or more arms when the PV module is secured in the clamp assembly. Furthermore, the second clamp portion may include one or more securing tabs that extend from a surface of the second clamp portion towards the first clamp portion. In an embodiment, a flange (or other portion) of the PV module frame may be secured between the one or more securing tabs and the one or more arms and/or the top surface of the stanchion.

Still further, the stanchion may include a crossmember spanning a distance between the first side and the second side of the stanchion. In an embodiment, the crossmember may be shaped to accommodate a rail (such as a ballast rail) between the crossmember and a bottom surface of the stanchion. Furthermore, the stanchion may include a tab proximate the first side of the stanchion and proximate a bottom portion of the stanchion. The tab of the stanchion may be shaped to be insertable into a slot in a rail. The stanchion may further include a mounting portion proximate the second side of the stanchion and proximate the bottom portion of the stanchion. The mounting portion may include an aperture therein through which a fastener may be insertable to secure the mounting portion of the stanchion to a rail (or other secondary structure), thereby securing the clamp assembly to the rail (or secondary structure). These and additional details of the clamp assembly are described below with reference to the drawings.

FIG. 1 illustrates a perspective view of an example clamp assembly 100. In FIG. 1, the clamp assembly 100 is shown as unattached to a secondary structure such as a rail or other secondary structure. As mentioned previously, the clamp assembly 100 may secure one or more PV modules to a secondary structure. For example, the clamp assembly 100 may be configured to be securable to a PV module frame, thereby securing the PV module thereto.

In an embodiment, the clamp assembly 100 includes a stanchion 102. The stanchion 102 may provide a frame (or structure) to which other components may be mounted. Furthermore, the stanchion 102 may be mounted to a roof or other portion of a secondary structure on which PV modules may be mounted. For example, the stanchion 102 may be mounted to a rail that is secured to a roof or other portion of a structure. The rail is shown and described further herein with respect to FIGS. 3-7. By mounting the stanchion 102 to the rail, the clamp assembly 100 may be secured thereto. While describing the stanchion 102 as being securable to a rail, it is to be understood that the stanchion 102 may be attached to another type of secondary structure (i.e., beam, frame, plate, etc.) and/or the stanchion 102 may be secured to the structure itself.

The stanchion 102 may include one or more attachment portions. For example, the stanchion 102 may include a tab 104 that is insertable into a lateral (or other shaped) slot in the rail. In an embodiment, the tab 104 may be shaped such that the tab 104 is inserted into the slot vertically and the stanchion 102 may be rotated towards the rail, once the tab is inserted into the slot. By inserting the tab 104 into a slot in the rail, a first side 106 of the stanchion 102 may be at least partially secured to the rail. In an embodiment, the stanchion 102 also includes a mounting portion 108. The mounting portion 108 may extend in a direction that is parallel to the rail. In an embodiment, the mounting portion 108 may include an aperture 110 therein, through which a bolt (or other type of fastener) may be inserted to secure the mounting portion 108 of the stanchion 102 to the rail. By fastening (or otherwise securing) the mounting portion 108 of the stanchion 102 to the rail, a second side 112 of the stanchion 102 may be secured to the rail. As shown in FIG. 1, one or more of the attachment portions (e.g., the tab 104 and the mounting portion 108) of the stanchion 102 may be located proximate a bottom portion 114 of the stanchion 102.

Furthermore, the stanchion 102 may include a crossmember 116 that spans a distance between the first side 106 of the stanchion 102 and the second side 112 of the stanchion 102. For example, the crossmember 116 extends transversely between the first side 106 and the second side 112 of the stanchion 112. In an embodiment, the crossmember 116 may be shaped to accommodate a ballast rail (or other structure, component, ballast, anchor, etc.) between the crossmember 116 and the bottom portion 114 of the stanchion 102. Additionally, and/or alternatively, the crossmember 116 may secure the ballast rail between the crossmember 116 and the rail to which the stanchion 102 is mounted. When the clamp assembly 100 is secured to the rail, the crossmember 116 may exert a downward force on the ballast rail. In an embodiment, the crossmember 116 may also provide structural support for the stanchion 102. The ballast rail is shown and described further herein with respect to FIG. 5.

Furthermore, the stanchion 102 may also include one or more apertures (not seen as a bolt is inserted therethrough in FIG. 1) proximate a top surface 118 of the stanchion. The top surface 118 of the stanchion 102 spans a distance between the first side 106 and the second side 112 of the stanchion 102. In an embodiment, a bolt 120 (or other suitable fastener) may be inserted through the apertures in the stanchion 102. For example, the bolt 120 may be inserted through apertures in the first side 106 and the second side 112 of the stanchion 102 such that the bolt 120 extends from the first side 106 to the second side 112, spanning a distance therebetween. In an embodiment, a nut 122 may be attached to an end of the bolt 120 once the bolt 120 is inserted through the apertures in the stanchion 102, thereby securing the bolt 120 to the stanchion 102. Additionally, and/or alternatively, the nut 122 may be fixedly attached to the first side 106 of the stanchion 102 such that the bolt 120 may be inserted through the second side 112 and may be rotated through an aperture in the first side 106 such that the bolt 120 is secured between the first side 106 and the second side 112 of the stanchion. In an embodiment, the bolt 120 may be inserted in the stanchion 102 such that the bolt 120 extends in a direction that is parallel or transverse to a direction of extension of the top surface 118 of the stanchion 102.

In an embodiment, the clamp assembly 100 further includes one or more clamp portions. For example, the clamp assembly 100 may include a first clamp portion 124 and a second clamp portion 126 mounted on the bolt 120. The first clamp portion 124 and/or the second clamp portion 126 may include threading therein and may be threaded onto the bolt 120. Additionally, and/or alternatively, the second clamp portion 126 may include threading, while the first clamp portion 124 does not include threading or vis versa. In an embodiment, the first clamp portion 124 and the second clamp portion 126 may be mounted on the bolt 120 such the first clamp portion 120 and the second clamp portion 126 are located between the first side 106 and the second side 112 of the stanchion 102. Furthermore, when the first clamp portion 124 and the second clamp portion 126 are mounted on the bolt 120 and the bolt 120 is rotated in a first direction, the bolt 120 draws the second clamp portion 126 towards the first clamp portion 124. Conversely, when the bolt 120 is rotated in a second direction, opposite the first direction, the bolt 120 causes the second clamp portion 126 to be moved away from the first clamp portion 124. In an embodiment, a PV module frame may be placed on the clamp assembly and the bolt 120 may be rotated in the first direction in order to clamp the PV module frame between the first clamp portion 124 and the second clamp portion 126. Furthermore, the second clamp portion 126 may include one or more grooves 127 that correspond with a shape of a portion of the first clamp portion 124. The grooves 127 are described further herein with respect to FIG. 2.

In an embodiment, the stanchion 102 may also include another aperture 128 located on the second side 112 of the stanchion 102. The aperture 128 may be configured to receive mounting equipment (such as fasteners or other type of mounting equipment). In an embodiment, a wind deflector (not shown) may be attached to the stanchion 102 via mounting equipment that is secured to the stanchion 102 via the aperture 128. A wind deflector may be attached to the second side 112 of the stanchion 102 in order to prevent or reduce air and/or debris from flowing underneath the PV module when installed in the clamp assembly 100.

Figure 2:
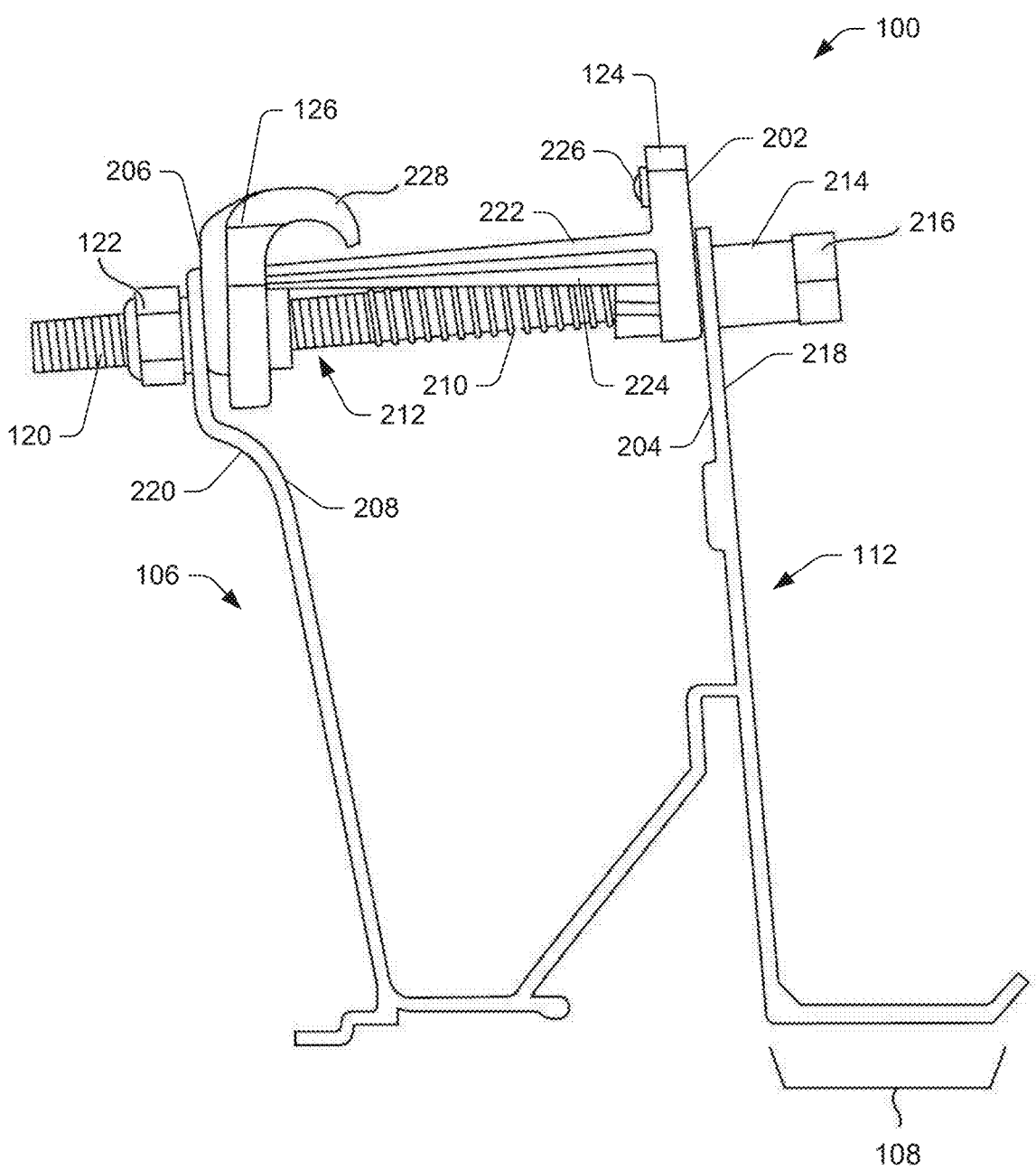
FIG. 2 illustrates a side view of an example clamp assembly according to an embodiment of this disclosure.

FIG. 2 illustrates a side view of the clamp assembly 100. As mentioned previously, the first clamp portion 124 and the second clamp portion 126 are mounted on the bolt 120 such that the first clamp portion 124 and the second clamp portion 126 are disposed between the first side 106 and the second side 112 of the stanchion 102. For example, and as shown in FIG. 2, a first surface (or "exterior surface") 202 of the first clamp portion 124 abuts an interior surface 204 of the second side 112 of the stanchion 102. Furthermore, a first surface (or "exterior surface") 206 if the second clamp portion 126 abuts an interior surface 208 of the first side 106 of the stanchion 102. In an embodiment, the exterior surface 206 of the second clamp portion 126 is in contact with the interior surface 208 of the first side 106 of the stanchion 102 when a PV module frame is absent from the clamp assembly 100. Furthermore, when a PV module frame is secured within the clamp assembly 100, the second clamp portion 126 may be drawn towards the first clamp portion 124 by rotating the bolt 120 such that the first clamp portion 124 may lose contact with the interior surface 208 of the first side 106. In such an example, the first clamp portion 124 may remain contacting the interior surface 204 of the second side. Additionally, and/or alternatively, the second clamp portion 126 may contact the interior surface 208 of the first side 106 when a PV module frame is secured therein.

In an embodiment, the clamp assembly 100 may further include a spring 210 that may be disposed on the bolt 120. For example, the bolt 120 may be inserted through the spring 210 as the bolt 120 is inserted into the stanchion 102. The spring 210 may be disposed such that the spring 210 contacts the first clamp portion 124 on a first end of the spring 210 and contacts a threaded portion 212 of the bolt 120 on a second end of the spring 210. Additionally, and/or alternatively, the second end of the spring 210 may contact the second clamp portion 126. In any configuration, the spring 210 may maintain a distance between the first clamp portion 124 and the second clamp portion 126 unless the spring 210 is compressed by a force. In an embodiment, the bolt 120 may include a threaded portion 212 and a non-threaded portion. In such an embodiment, when mounted on the bolt 120, the first clamp portion 124 may be mounted on the non-threaded portion of the bolt 120 while the second clamp portion 126 is mounted on the threaded portion 212. As such, when the bolt 120 is rotated, the second clamp portion 126 may move relative to the first clamp portion 124 while the first clamp portion 124 remains substantially stationary.

Furthermore, the clamp assembly 100 may further include a spacer 214 disposed on the bolt 120 between a head 216 of the bolt 120 and an exterior surface 218 of the second side 112 of the stanchion 102. The spacer 214 may be sized to prevent, minimize, and/or restrict movement of the bolt 120 when the nut 122 is not secured to the threaded portion 212 of the bolt 120 and/or if the nut 122 is secured to the bolt 120 but is not contacting an exterior surface 220 of the first side 106 of the stanchion 102. In an embodiment, the spacer 214 may be sized so as to allow some lateral movement of the bolt 120. Such movement of the bolt 120 may provide tolerance for variation between PV module sizes and/or mounting location of the clamp assembly 100 to the rail.

In an embodiment, the first clamp portion 124 may include one or more arms 222 that extend in a direction towards the second clamp portion 126. When secured in the clamp assembly 100 a portion of the PV module frame may rest on the arms 222 of the first clamp portion 124. Furthermore, when a PV module frame is secured in the clamp assembly 100, a portion of the arms 222 may overlap a portion of the second clamp portion 126. The arms 222 may include a pair of arms that are symmetrical across a central axis of the first clamp assembly 124. The arms 222 may include one or more flanges 224 extending from a bottom side of the arms 222. The flanges 224 may provide additional strength to the arms 222 to support the PV module thereon. Referring back to FIG. 1, the second clamp portion 126 may include one or more grooves 127 that are shaped and positioned to correspond with the flanges 224 extending from the arms 222. The grooves 127 in the second clamp portion 126 may allow the first clamp portion 124 and the second clamp portion 126 to overlap by accommodating the flanges 224 of the arms 224. The first clamp portion 124 may further include one or more bonding pins 226 that may contact the PV module and may be configured as an electrical connector between the PV module and other PV modules and/or a power management system.

Furthermore, the second clamp portion 126 may include one or more securing tabs 228. In an embodiment, the securing tabs 228 may be hooked and may extend from a surface of the second clamp portion 126 towards the first clamp portion 124. The securing tabs 228 may secure a portion of the PV module frame between the securing tabs 228 and the arms 22 and/or the top surface 118 of the stanchion 102. Thus, the securing tabs 228 may eliminate and/or reduce upward movement of the PV module frame once the frame has been secured in the clamp assembly 100.

Figure 3:
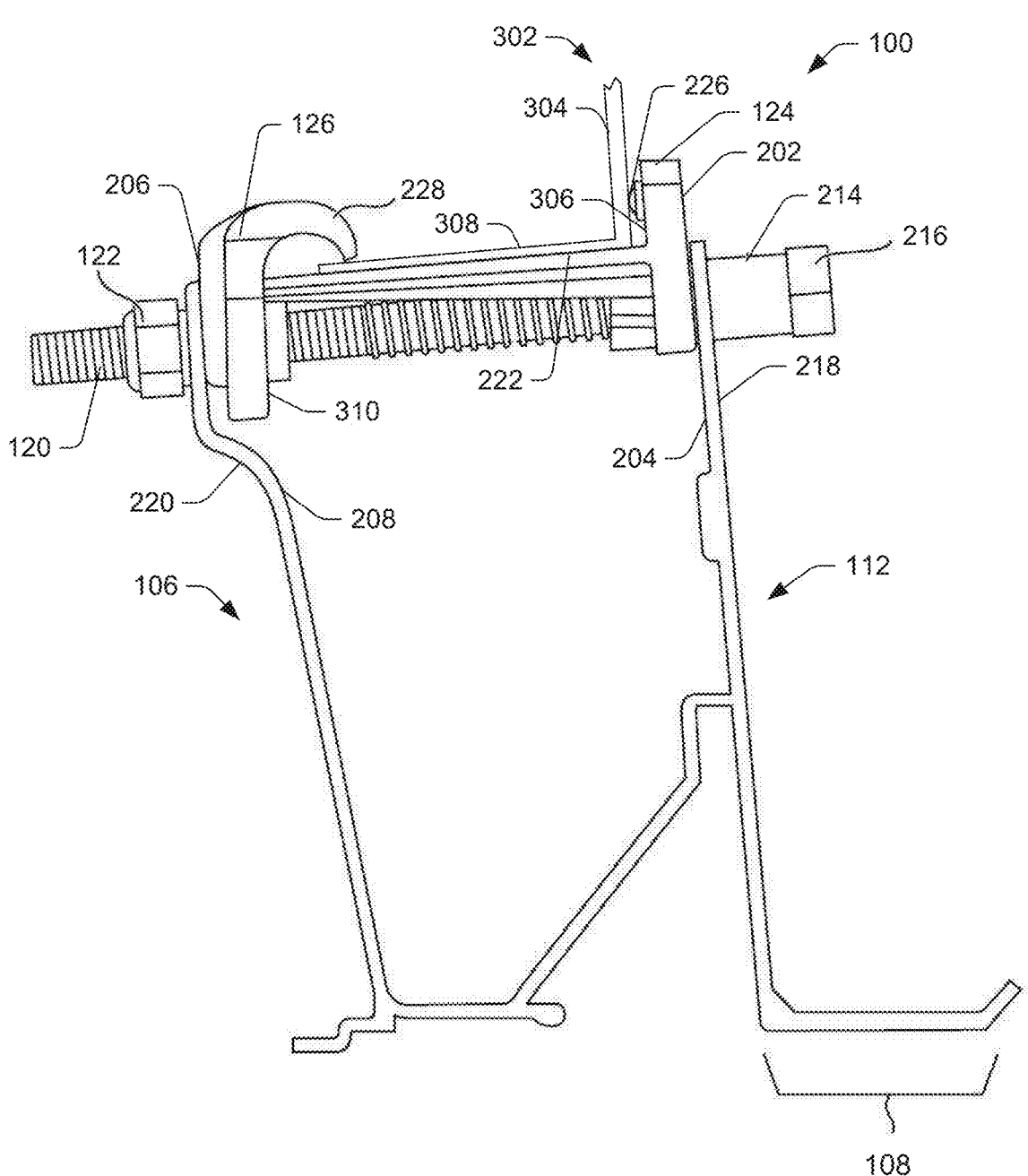
FIG. 3 illustrates a side view of an example clamp assembly showing a portion of a photovoltaic module frame secured therein according to an embodiment of this disclosure.

FIG. 3 illustrates a side view of the clamp assembly 100 with a cutaway portion of a PV module frame (referred to herein as "a frame") 302 secured therein. As shown in FIG. 3, the frame 302 may rest on a surface of the arms 222 and/or the top surface (not shown in FIG. 3) of the stanchion 102. Furthermore, when the frame 302 is secured in the clamp assembly 100, a vertical portion 304 of the frame 302 may contact an interior surface 306 of the first clamp assembly 124. Additionally, and/or alternatively, the frame 302 may contact the bonding pins 226 when the frame 302 is secured in the clamp assembly 100. As mentioned previously, when the frame 302 is secured in the clamp assembly 100, a flange 308 of the frame 302 may be secured between the securing tabs 228 of the second clamp portion 126 and the arms 222 of the first clamp portion 124. Furthermore, the bolt 120 may be rotated to move the second clamp portion 126 towards the first clamp portion 124 until an interior surface 310 of the second clamp portion 126 contacts an end of the flange 308, thereby securing the frame 302 between the first clamp portion 124 and the second clamp portion 126.

Figure 4:
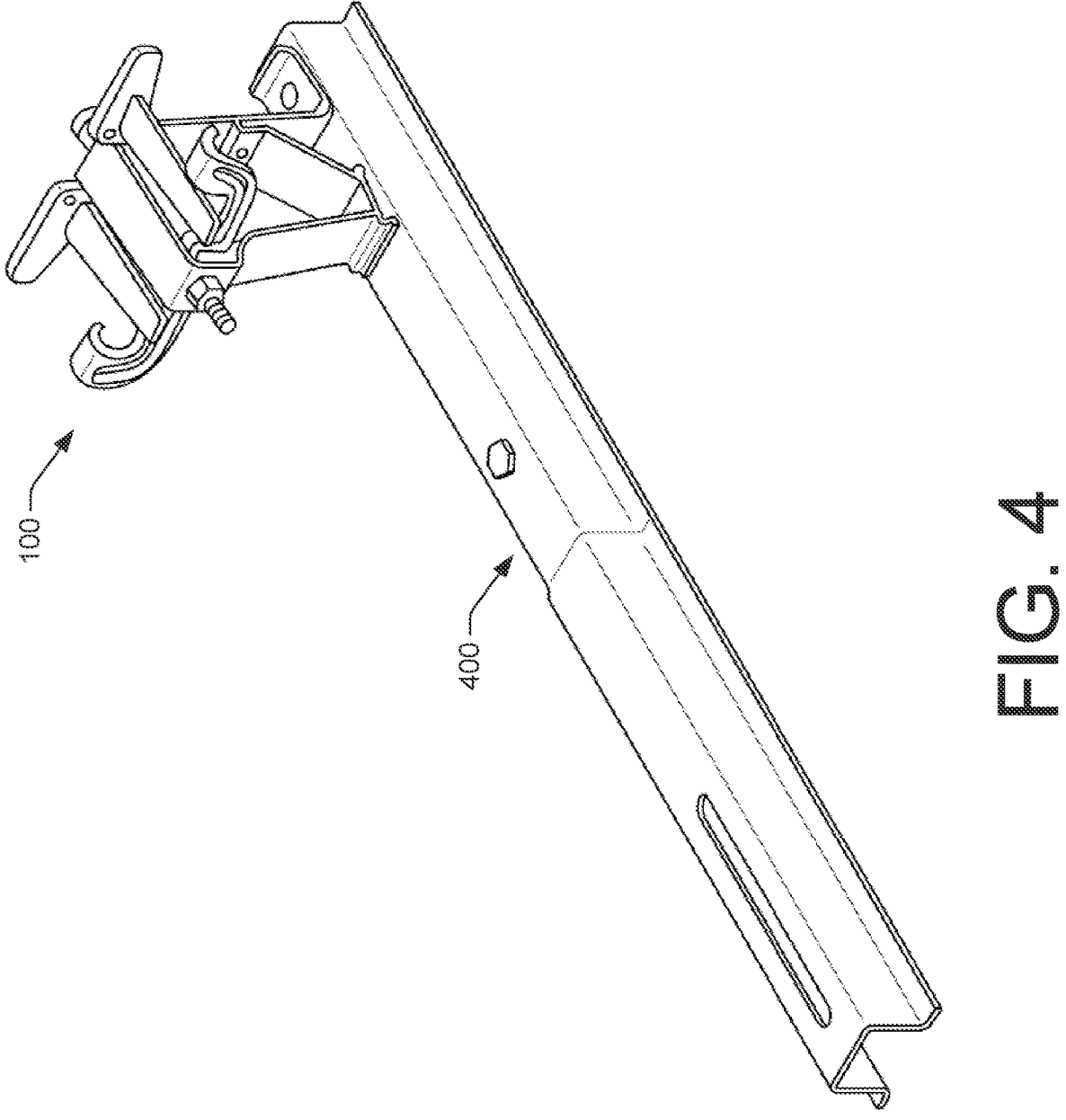
FIG. 4 illustrates a perspective view of an example clamp assembly mounted on a rail according to an embodiment of this disclosure.

FIG. 4 illustrates a perspective view of the clamp assembly 100 secured to a rail 400. As described previously, the tab 104 (not seen in FIG. 4) of the clamp assembly 100 may be inserted into a slot in the rail 400. Furthermore, the mounting portion 106 of the clamp assembly 100 may be secured to the rail 400 via one or more fasteners. In an embodiment, the rail 400 may be mounted to a structure such as a roof or other portion of a secondary structure.

Figure 5:
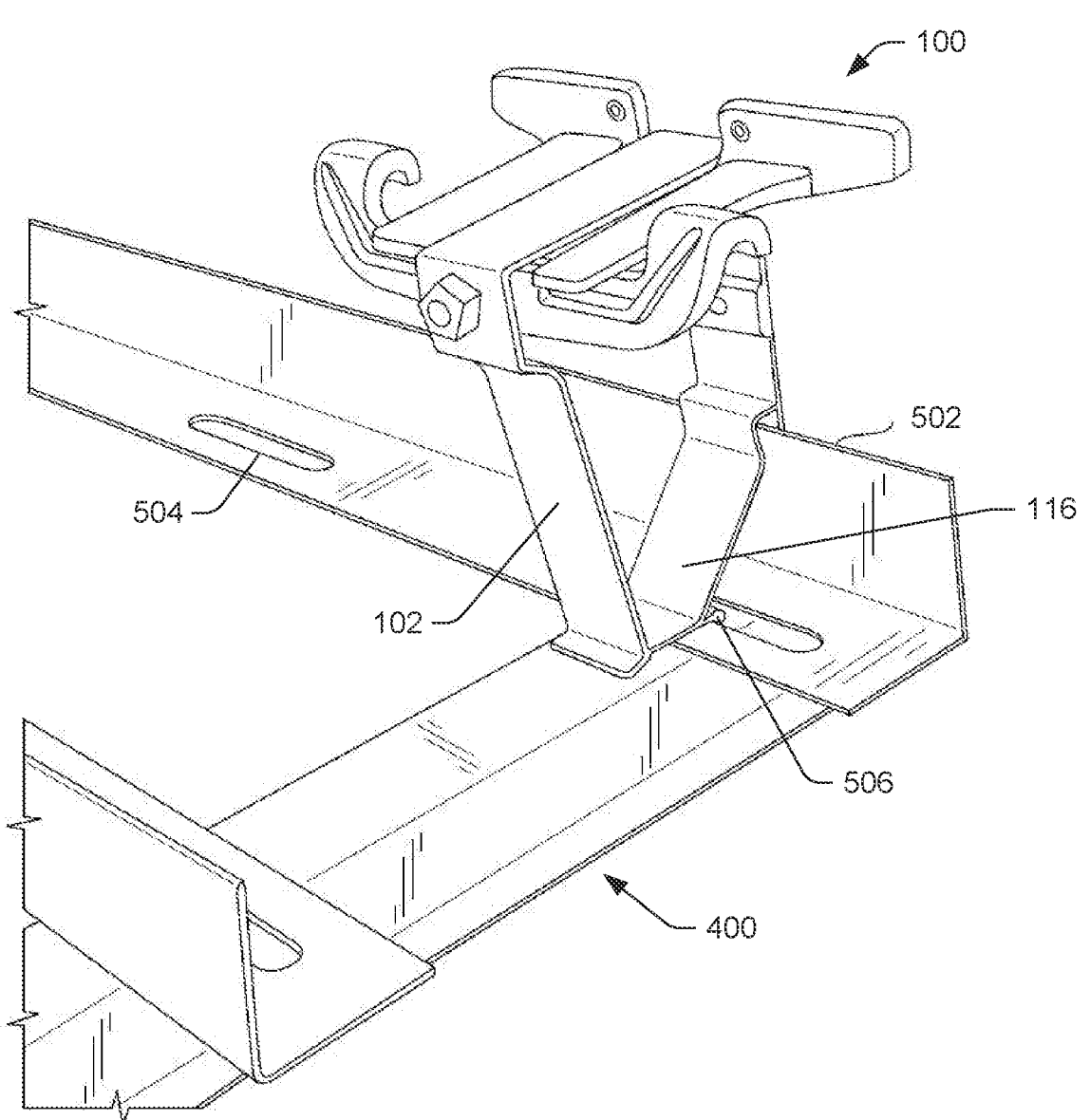
FIG. 5 illustrates a perspective view of an example clamp assembly mounted on a rail with a ballast rail secured at least partially by the clamp assembly according to an embodiment of this disclosure.

FIG. 5 illustrates a perspective view of the clamp assembly 100 mounted on the rail 400 with a ballast rail 502 secured to the rail 400 at least partially by the clamp assembly 100. As mentioned previously, the clamp assembly 100 includes a crossmember 116 that spans a distance between sides of the stanchion 102. The crossmember 116 may be shaped to accommodate the ballast rail 502 between the crossmember 116 and the rail 400. When the clamp assembly 100 is secured to the rail 400, the crossmember 116 may exert a downward force on the ballast rail 502.

In an embodiment, a ballast block (or other weight) may be placed and/or secured to the ballast rail 502 in order to anchor the PV module and PV module mounting components (i.e., the clamp assembly 100, the rail 400, the ballast rail 502, and/or other mounting components) As shown in FIG. 5, the ballast rail 502 may include one or more apertures 504 therein. The apertures 504 of the ballast rail 502 may provide one or more attachment points to which the ballast block may be secured. Furthermore, as shown in FIG. 5, the crossmember 116 may include a flange 506 that engages with the apertures 504 of the ballast rail 502 to secure the ballast rail 502 and prevent and/or reduce movement of the ballast rail 502 when the clamp assembly 100 secures the ballast rail 502 between the clamp assembly and the rail 400.

Figure 6:
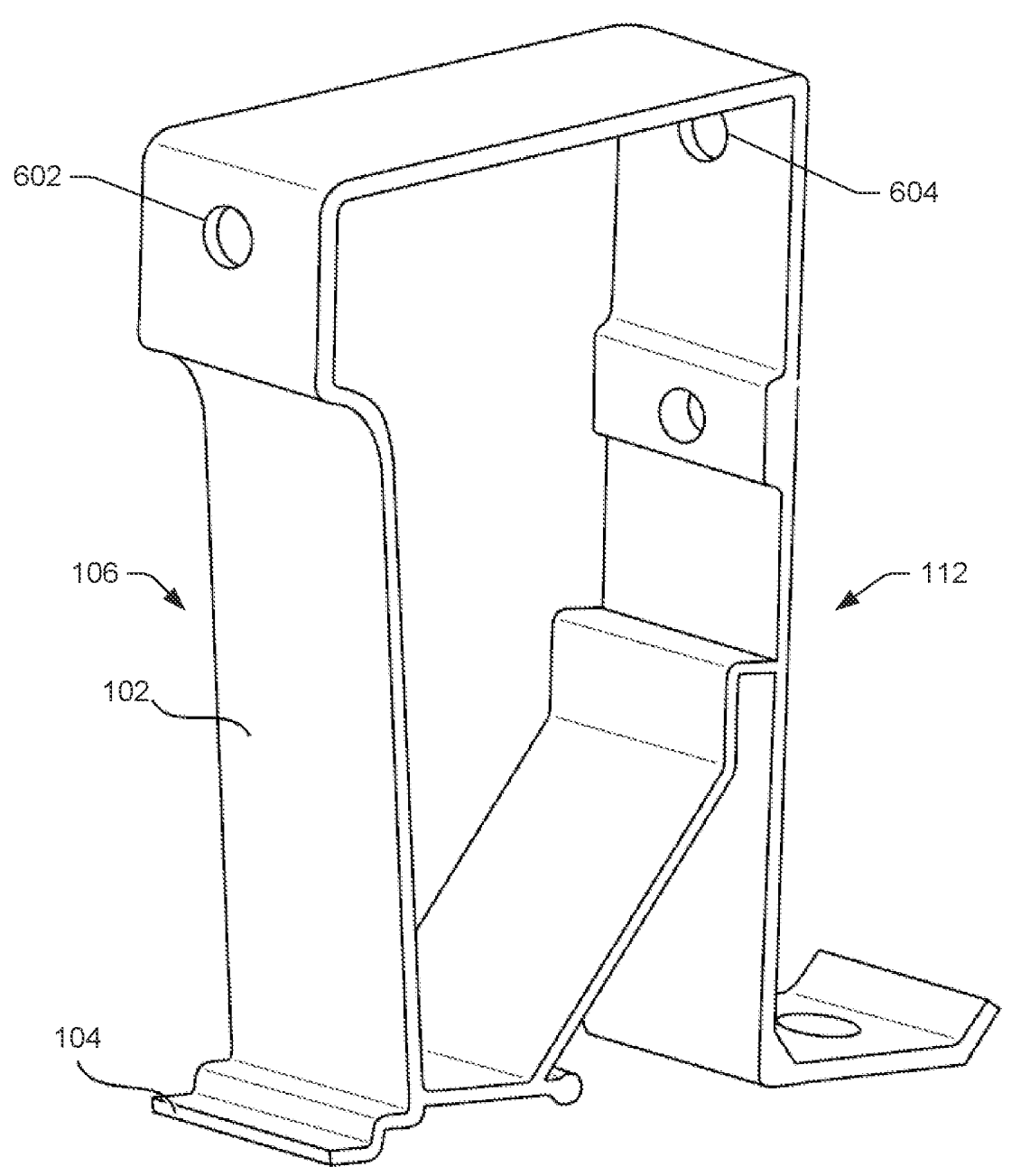
FIG. 6 illustrates a perspective view of an example stanchion of an example clamp assembly according to an embodiment of this disclosure.

FIG. 6 illustrates a perspective view of the stanchion 102 of the clamp assembly 100. As mentioned previously, the stanchion 102 provides a frame to which other components of the clamp assembly 100 may be mounted. For example, the stanchion 102 may include one or more apertures proximate the top surface 118 of the stanchion. In an embodiment, the stanchion 102 includes a first aperture 602 on the first side 106 of the stanchion 102 and a second aperture 604 on the second side 112 of the stanchion 102. The bolt 120 may be inserted through the first aperture 602 and the second aperture 604.

Figure 7:
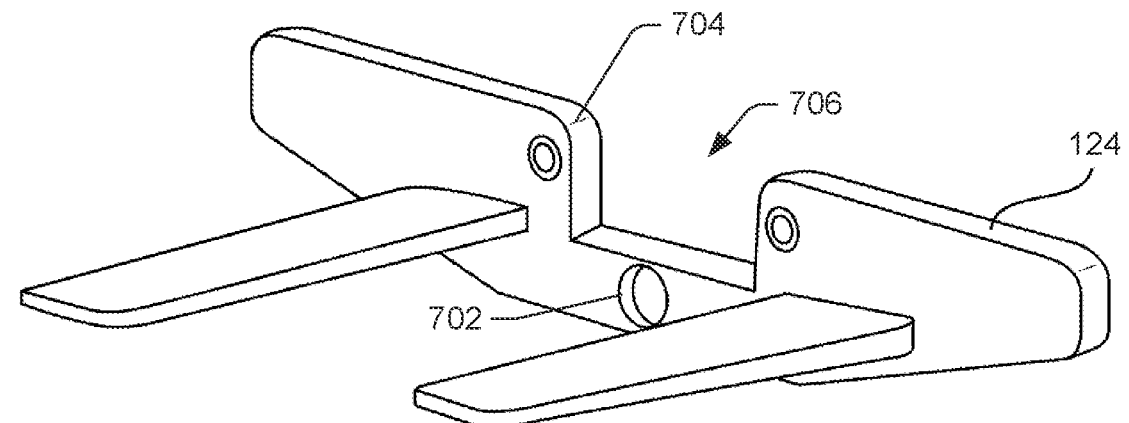
FIG. 7 illustrates a perspective view of an example first clamp portion of an example clamp assembly according to an embodiment of this disclosure.

FIG. 7 illustrates a perspective view of the first clamp portion 124 of the clamp assembly 100. The first clamp portion 124 may be mounted on the bolt 120 via an aperture 702 in the first clamp portion 124. For example, the first clamp portion 124 may be slid, threaded, or otherwise mounted onto the bolt 120 by inserting the bolt 120 through the aperture 702 in the first clamp portion 124. Furthermore, the first clamp portion 124 may include shoulders 704 on either side of a gap 706. In an embodiment, the gap 706 may be shaped to accommodate the top surface 118 of the stanchion 102 therein. The first clamp portion 124 may include the features previously described with respect to FIGS. 1-3.

Figure 8:
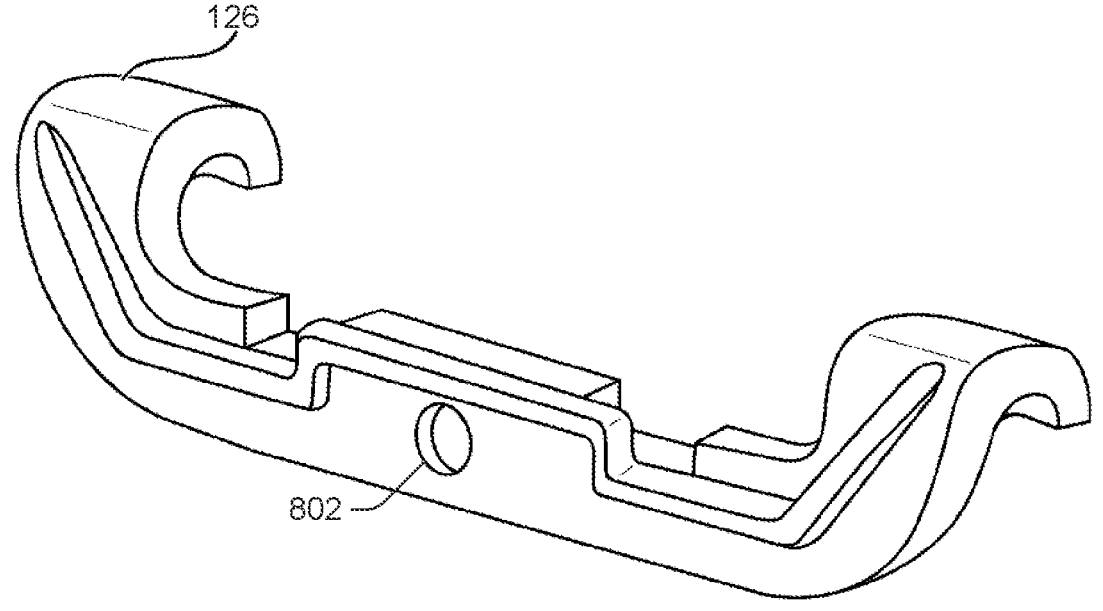
FIG. 8 illustrates a perspective view of an example second clamp portion of an example clamp assembly according to an embodiment of this disclosure.

FIG. 8 illustrates a perspective view of the second clamp portion 126 of the clamp assembly 100. The second clamp assembly 126 may be mounted on the bolt 120 via an aperture 802 in the second clamp portion 126. For example, the second clamp portion 126 may be slid, threaded, or otherwise mounted on the bolt 120 by inserting the bolt 120 through the aperture 802 in the second clamp portion 126. The second clamp portion 126 may include the features previously described with respect to FIGS. 1-3.

CONCLUSION

Although several embodiments have been described in language specific to structural features and/or methodological acts, it is to be understood that the claims are not necessarily limited to the specific features or acts described. Rather, the specific features and acts are disclosed as illustrative forms of implementing the claimed subject matter.

What is claimed is:

1. A clamp assembly comprising:

a first clamp portion shaped to rest against an outside corner of a photovoltaic (PV) module frame, the first clamp portion including a pair of arms laterally spaced apart in a first direction and extending in a second direction transverse to the first direction;

a bolt extending through an aperture in the first clamp portion, in the second direction; and a second clamp portion mounted on the bolt opposite the first clamp portion, the second clamp portion including a pair of hooked tabs to hook over an inside return flange of the PV module frame, and the pair of hooked tabs being laterally spaced apart in the first direction so as to be positioned laterally adjacent to the pair of laterally spaced arms of the first clamp portion in the first direction, wherein, when the bolt is rotated, the second clamp portion is drawn toward the first clamp portion.

2. The clamp assembly according to claim 1, further comprising a stanchion disposed on the bolt, wherein the stanchion has a first side and a second side that is opposite the first side, and wherein the clamp assembly further comprises a tab extending outwardly from the first side of the stanchion.

3. The clamp assembly according to claim 2, further comprising a mounting portion extending outwardly from the second side of the stanchion.

4. The clamp assembly according to claim 3, wherein the mounting portion of the stanchion has an aperture therethrough, the aperture being sized to accommodate a fastener therein.

5. The clamp assembly according to claim 2, wherein the stanchion is defined, at least in part, by a frame having a top surface that extends from the first side to the second side, and wherein the first clamp portion is attached to the bolt beneath the top surface and between the first side and the second side of the frame.

6. The clamp assembly according to claim 2, wherein the stanchion is defined, at least in part, by a frame having a top surface that extends from the first side to the second side, and wherein the second clamp portion is attached to the bolt beneath the top surface and between the first side and the second side of the frame.

7. A clamp assembly comprising:

a stanchion defined by a frame having a first side, a second side, a clamping end, and a mounting end, the stanchion including:

a bolt extending through the first side of the frame and the second side of the frame at the clamping end, a tab extending, in a first direction, from the first side of the frame at the mounting end, and a mounting portion extending, in a second direction opposite the first direction, from the second side of the frame at the mounting end;

a first clamp portion including a pair of arms laterally spaced apart in a third direction and extending in the first direction transverse to the third direction, and attached to the bolt between the first side and the second side of the frame; and a second clamp portion mounted on the bolt opposite the first clamp portion, the second clamp portion including a pair of hooked tabs attached to the bolt between the first side and the second side of the frame, and the pair of hooked tabs being laterally spaced apart in the third direction so as to be positioned on opposite sides of the pair of laterally spaced arms of the first clamp portion, wherein, when rotated, the bolt draws the second clamp portion toward the first clamp portion.

8. The clamp assembly according to claim 7, wherein the pair of arms of the first clamp portion extend parallel to a direction of extension of the bolt between the first side and the second side of the frame.

9. The clamp assembly according to claim 7, wherein the pair of hooked tabs of the second clamp portion extend on opposite sides of the bolt, and a free end of the pair of hooked tabs is disposed between the first side and the second side of the frame.

10. The clamp assembly according to claim 7, wherein the pair of hooked tabs of the second clamp portion are connected to each other via a central body portion, and the central body portion has a threaded aperture to engage the bolt.

11. The clamp assembly according to claim 7, wherein the pair of arms of the first clamp portion and the pair of hooked tabs of the second clamp portion are disposed laterally adjacent.

12. The clamp assembly according to claim 7, wherein the pair of hooked tabs of the second clamp portion are positioned such that respective free ends of the pair of hooked tabs are spaced apart a vertical distance from a surface of the respective pair of arms of the first clamp portion.

13. The clamp assembly according to claim 7, wherein the mounting portion has an aperture therethrough to accommodate a fastener therein.

14. A clamp assembly comprising:

a stanchion defined by a frame having a first side, a second side, a clamping end, and a mounting end, the stanchion including:

a tab extending, in a first direction, from the first side of the frame at the mounting end, and a mounting portion extending, in a second direction opposite the first direction, from the second side of the frame at the mounting end;

a first clamp portion including a pair of arms attached to the stanchion between the first side and the second side of the frame, the pair of arms laterally spaced apart in a third direction and extending in the first direction transverse to the third direction;

a second clamp portion including a pair of hooked tabs attached to the stanchion between the first side and the second side of the frame, and the pair of hooked tabs being laterally spaced apart in the third direction so as to be positioned on opposite sides of the pair of laterally spaced arms of the first clamp portion; and a bolt extending through the stanchion, the first clamp portion, and the second clamp portion, wherein when the bolt is rotated, the second clamp portion is drawn toward the first clamp portion.

15. The clamp assembly according to claim 14, wherein the first side of the frame is connected to the second side of the frame at the clamping end and at the mounting end.

16. The clamp assembly according to claim 15, wherein the frame includes:

a first aperture in the first side, and a second aperture in the second side, the first aperture and the second aperture being coaxially aligned.

17. The clamp assembly according to claim 14, wherein the first clamp portion is aligned with the second clamp portion such that upon drawing the first clamp portion to the second clamp portion, the pair of arms are laterally aligned adjacent to the pair of hooked tabs.

18. The clamp assembly according to claim 14, further comprising a bolt extending through the first side and the second side of the frame of the stanchion.

19. The clamp assembly according to claim 18, wherein the bolt is secured in place on the frame via a nut disposed on an outer surface of the first side of the frame.

20. The clamp assembly according to claim 14, wherein the tab includes:

a first horizontal portion extending from the first side of the frame in the first direction, a vertical portion extending from the first horizontal portion in a fourth direction orthogonal to the first direction, and a second horizontal portion extending from the vertical portion in the first direction.

* * * * *